(12) United States Patent  
Van Nieuwenhuyze et al.

(10) Patent No.: US 9,628,146 B2  
(45) Date of Patent: Apr. 18, 2017

(54) DATA ACCESS IN A MOBILE DEVICE WITH NFC

(71) Applicants: PROTON WORLD INTERNATIONAL N.V., Zaventem (BE); STMICROELECTRONICS (ROUSSET) SAS, Rousset (FR)

(72) Inventors: Olivier Van Nieuwenhuyze, Wezembeek-Oppem (BE); Alexandre Charles, Auriol (FR)

(73) Assignees: Proton World International N.V., Diegem (BE); STMicroelectronic (Rousset) SAS, Rousset (FR)

( * ) Notice: Subject to any disclaimer, the term of this patent is extended or adjusted under 35 U.S.C. 154(b) by 0 days.

(21) Appl. No.: 14/871,851

(22) Filed: Sep. 30, 2015

(65) Prior Publication Data

US 2016/0156386 A1   Jun. 2, 2016

(30) Foreign Application Priority Data

Nov. 28, 2014   (FR) ..................................... 14 61631

(51) Int. Cl.
*H04W 12/00* (2009.01)
*H04B 5/00* (2006.01)
*G06K 7/10* (2006.01)
*H04W 4/00* (2009.01)

(52) U.S. Cl.
CPC ....... *H04B 5/0031* (2013.01); *G06K 7/10237* (2013.01); *H04W 4/008* (2013.01)

(58) Field of Classification Search
USPC ...... 455/411, 41.1, 558, 552.1, 556.1, 550.1, 455/41.3, 410; 705/39, 14.17, 44, 64, 18, 705/41, 17, 76
See application file for complete search history.

(56) References Cited

U.S. PATENT DOCUMENTS

| 8,583,179 | B2 | 11/2013 | Rizzo et al. | |
| 2008/0144650 | A1 | 6/2008 | Boch et al. | |
| 2009/0291634 | A1* | 11/2009 | Saarisalo | H04M 1/72527 455/41.1 |
| 2010/0161403 | A1* | 6/2010 | Fisher | G06Q 20/102 705/14.38 |
| 2010/0210300 | A1 | 8/2010 | Rizzo et al. | |
| 2012/0143707 | A1* | 6/2012 | Jain | G06Q 20/20 705/18 |

(Continued)

FOREIGN PATENT DOCUMENTS

EP   2 219 353 A1   8/2010

OTHER PUBLICATIONS

French Search Report, received Jul. 6, 2015, for corresponding FR Application No. 1461631, 8 pages.

(Continued)

*Primary Examiner* — Ganiyu A Hanidu  
(74) *Attorney, Agent, or Firm* — Seed IP Law Group LLP

(57) ABSTRACT

The disclosure concerns an NFC (near field communications) device having an NFC router. The NFC router includes a memory adapted to store data to be shared with an external device and an NFC antenna circuit. The NFC router is capable of operating in a card emulation mode in which the shared data stored by the memory is accessible via the NFC antenna circuit.

23 Claims, 2 Drawing Sheets

(56) References Cited

U.S. PATENT DOCUMENTS

| | | | | |
|---|---|---|---|---|
| 2013/0054474 A1* | 2/2013 | Yeager | ............... | G06Q 20/3223 |
| | | | | 705/71 |
| 2013/0059566 A1* | 3/2013 | Huque | ................. | H04W 12/08 |
| | | | | 455/411 |
| 2014/0183269 A1* | 7/2014 | Glaser | .................... | G06F 21/32 |
| | | | | 235/492 |
| 2014/0327523 A1 | 11/2014 | Daniel et al. | | |
| 2015/0044964 A1* | 2/2015 | Khan | ..................... | G06F 21/35 |
| | | | | 455/41.1 |

OTHER PUBLICATIONS

International Standard, "Identification cards—Integrated circuit cards—Part 4: Organization, security and commands for interchange," ISO/IEC 7816-4, Second edition, Jan. 15, 2005, 90 pages.
International Standard, "Information technology—Security technique—Message Authentication Codes (MACs)—Part 1: Mechanism using a block cipher," ISO/IEC 9797-1:1999(E), 17 pages.
Security and Key Management, "EMV Integrated Circuit Card Specifications for Payment Systems," Book 2, Version 4.3, Nov. 2011, 174 pages.

* cited by examiner

DATA ACCESS IN A MOBILE DEVICE WITH NFC

This application claims the priority benefit of French Patent application number 14/61631, filed on Nov. 28, 2014, the contents of which is hereby incorporated by reference in its entirety to the maximum extent allowable by law.

BACKGROUND

Technical Field

The present disclosure relates to the field of mobile communications devices, and in particular to a method and device for near field communications (NFC).

Description of the Related Art

Mobile telephones and other types of mobile devices are increasingly being equipped with NFC (Near Field Communications) interfaces, which enable them to perform electromagnetic transponder functions over relatively short distances in addition to their other functions. In particular, such devices are able to emulate the functions of an electromagnetic transponder, which could be of the contactless card type, or the contactless reader type. Such functionality for example enhances the mobile device, by allowing it to be used for various applications, for example as an electronic wallet allowing payments to be made and/or by transport applications for accessing services such as transport networks.

To emulate the operation of a contactless card, the mobile device is generally equipped with a contactless front-end integrated circuit (CLF), also called an NFC router. This router is equipped with a radio frequency (RF) transceiver front-end coupled to a low-range antenna to match the communication capabilities of an electromagnetic transponder. In some applications, a secure element (SE) can be used to provide authentication.

In some cases it would be desirable for certain data held by the mobile device to be available even when the mobile device is no longer powered. For example, the host processor of the mobile telephone may be capable of performing card emulation, often referred to as "Host Card Emulation". However, if the mobile telephone is switched off, or if the battery is totally out of power, Host Card Emulation is not able to work. There is a technical problem permitting data held by the mobile device to be accessible irrespectively of whether or not the mobile device is powered.

BRIEF SUMMARY

It is an aim of embodiments of the present description to at least partially address one or more problems in the prior art.

According to one aspect, there is provided an NFC (near field communications) device comprising: an NFC router comprising a memory adapted to store data to be shared with an external device; and an NFC antenna circuit, wherein the NFC router is capable of operating in a card emulation mode in which the shared data stored by the memory is accessible via the NFC antenna circuit.

According to an embodiment, the NFC router is adapted to verify, in response to a request from an external device to access the shared data, one or more access conditions before transmitting the data to the external device via the NFC antenna circuit.

According to an embodiment, the NFC router is adapted to verify a first access condition by verifying a digital signature associated with the request.

According to an embodiment, the NFC router is coupled to a processor of the NFC device for receiving the shared data to be stored in said memory.

According to an embodiment, the NFC router is adapted to detect whether a device requesting to access the shared data is the processor of the NFC device or an external device, and to selectively apply one or more access conditions based on said detection.

According to an embodiment, the NFC router is adapted to apply a first access condition for access requests detected as coming from the processor of the NFC device, and a second access condition, different from the first access condition, for access requests detected as coming from an external device.

According to an embodiment, the one or more access conditions to be applied are selected based further on one or more of: the ON/OFF state of the NFC device; the charge state of a battery of the NFC device; whether the requested access to the shared data is a read or write request.

According to an embodiment, the shared data stored by the memory comprises first data accessible by an external device without any access condition and second data accessible by an external device only if one or more access conditions are satisfied.

According to an embodiment, the NFC device further comprises one or more sensors for detecting one or more environmental parameters, and the NFC router is adapted to store the data to be shared in said memory if a reading from at least one of the sensors exceeds a threshold.

According to an embodiment, the one or more sensors comprise at least one of: a humidity sensor; an accelerometer; a positioning device; and a temperature sensor.

According to a further aspect, there is provided a method comprising: storing, in a memory of a near field communications router of an NFC device, data to be shared with an external device; and during a card emulation mode, providing by the NFC router to the external device access to the shared data via an NFC antenna circuit.

According to an embodiment, the method further comprises: receiving by the NFC router a request from an external device to access the shared data; verifying, by the NFC router in response to the request, one or more access conditions; and transmitting the data to the external device if the one or more access conditions are satisfied.

According to an embodiment, verifying the one or more access conditions comprises verifying, by the NFC router, a digital signature associated with the request.

According to an embodiment, the method further comprises detecting, using one or more sensors, one or more environmental parameters, the storage of the data in the memory being triggered by a reading from at least one of the sensors exceeding a threshold.

According to an embodiment, the one or more environmental parameters comprise at least one of: a humidity level; an acceleration reading; a geographic position of the NFC device; and a temperature level.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings.

The foregoing and other features and advantages will become apparent from the following detailed description of embodiments, given by way of illustration and not limitation with reference to the accompanying drawings, in which.

DETAILED DESCRIPTION

Figure 1:
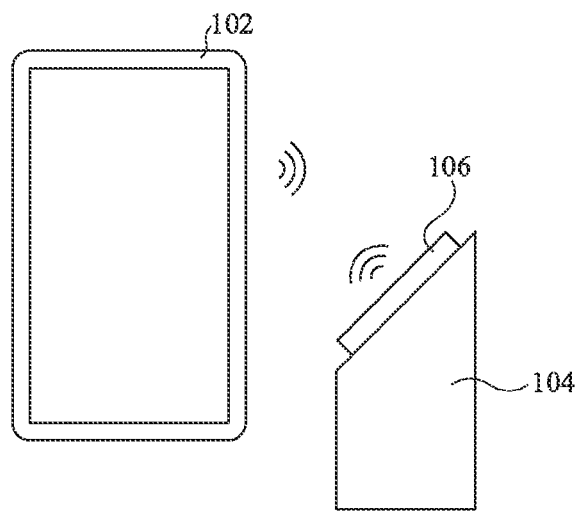
FIG. 1 schematically illustrates an NFC device capable of near field communications according to example embodiment of the present disclosure.

FIG. 1 schematically illustrates an NFC device 102, capable of NFC communications. For example, the device 102 is a mobile communications device, such as a mobile telephone, smartphone, a tablet computer, digital media player or the like, equipped with NFC circuitry.

The NFC device 102 of FIG. 1 is shown in a communication with a reader 104, comprising an NFC transponder 106. For example, the reader 104 is positioned at an entry barrier of a restricted area such as at the entrance to a transport network or the like. When used with such a reader, the NFC circuit of the NFC device 102 for example operates in a tag emulation mode.

Figure 2:
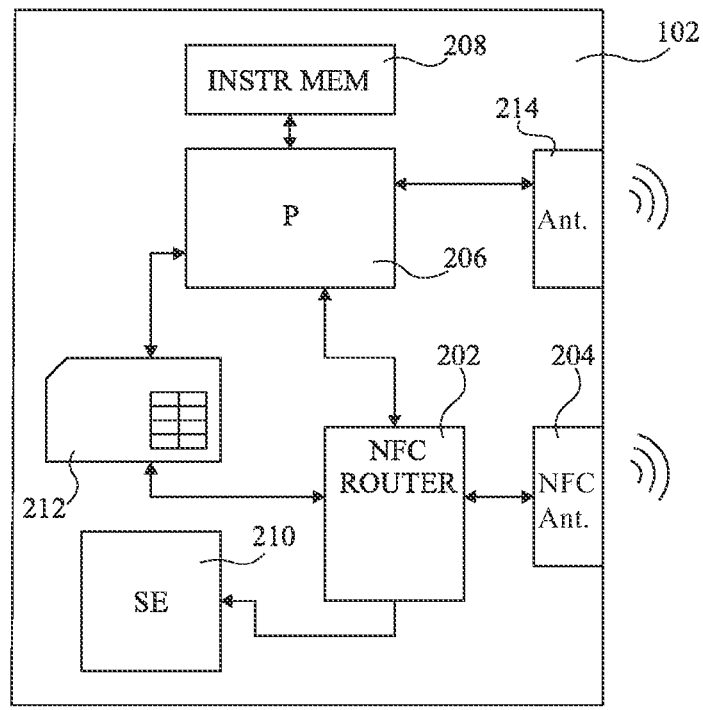
FIG. 2 schematically illustrates the NFC device of FIG. 1 in more detail according to example embodiment of the present disclosure.

FIG. 2 schematically illustrates the NFC device 102 in more detail according to example embodiment.

As illustrated, the device 102 for example comprises an NFC router (NFC ROUTER) 202, also known in the art as a contactless front-end (CLF). The NFC router 202 is coupled to an NFC antenna circuit 204, and together the router 202 and the antenna circuit 204 provide an NFC circuit for emulating the behavior of an NFC transponder.

The NFC router 202 is also for example coupled to a host processing device (P) 206 of the NFC device 102. The processing device 206 for example comprises one or more processors under the control of instructions stored in an instruction memory (INSTR MEM) 208. Memory 208 is for example a Flash memory, and stores one or more applications that have been loaded onto the device. The NFC router 202 is also for example coupled to other devices, including one or more secure elements. Each secure element may have one of several form factors, and in particular may be for example a UICC (universal integrated circuit card), an eUICC (embedded UICC), an embedded secure element (eSE) integrated in the mobile device or contained in a micro-circuit of the subscriber identification module (SIM), a universal SIM (USIM) or a μSD (micro secure digital). In the example of FIG. 2, a secure element (SE) 210 and USIM (Universal Subscriber Identification Module) circuit 212 are illustrated. The USIM circuit 212 is for example coupled to the NFC router 202 via an SWP (single wire protocol) link, and is additionally coupled to the host processing device 206.

The host processing device 206 is also for example coupled to one or more antenna circuits 214, which for example permit telecommunications within a cellular network, and/or wireless communications according to other standards such as Wi-Fi, Bluetooth, etc.

Figure 3:
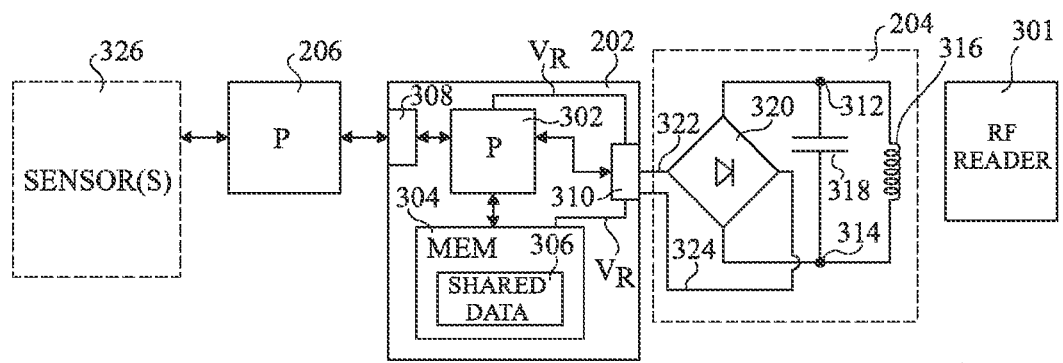
FIG. 3 schematically illustrates a system for communications between the device of FIG. 2 and an RF reader according to example embodiment of the present disclosure.

FIG. 3 schematically illustrates a system for communications between the NFC device 102 of FIG. 2 and an RF reader (RF READER) 301.

As illustrated, the NFC router 202 for example comprises a processing device (P) 302 coupled to a memory (MEM) 304 storing shared data (SHARED DATA) 306. The memory 304 is for example a flash memory or EEPROM (electrically erasable programmable read-only memory), or other type of memory. The processing device 202 for example comprises one or more processors under the control of instructions also for example stored in the memory 304. The processing device 302 is for example coupled via a suitable communications interface 308 to the host processing device 206 of the NFC device 102. For example, the link between the processing device 206 and the NFC router 202 is a serial link, and the interface 308 provides serial to parallel conversion.

The processing device 302 is also coupled via a communications interface 310 to the NFC antenna circuit 204.

The NFC antenna circuit 204 for example comprises nodes 312 and 314 coupled to an oscillating circuit formed of the parallel connection of an inductive element 316 that forms the antenna of the NFC antenna circuit 204, and a capacitive element 318. In alternative embodiments, the inductive element 316 could be coupled in series with the capacitive element 318, which could be integrated in the NFC router 202.

The nodes 312 and 314 of the NFC antenna circuit 204 are coupled to respective inputs of a rectifying bridge 320 having output lines 322 and 324 coupled to the communications interface 310.

The communications interface 310 for example provides radio frequency coding and decoding. Additionally, the interface 310 for example generates a supply voltage $V_R$ from the received signal when the NFC router 202 is operating in the card emulation mode in order to power the processing device 302 and the memory 304.

In some embodiment, the processing device 206 is coupled to one or more sensors (SENSOR(S)) 326, which for example monitor one or more environmental parameters. For example, the sensors 326 include a humidity detector, an accelerometer, a temperature sensor, and/or a positioning device such as a GPS (global positioning system) device.

In operation, when the NFC device 102 is powered, the memory 304 of the NFC router 202 is, for example, accessible by the processing device 206. For example, the processing device 206 may write the shared data to the memory 304 and optionally be capable of reading the shared data from the memory 304. Furthermore the memory 304 of the NFC router 202 is also for example accessible by an external device, such as the RF reader 301, while the NFC device 102 is powered.

When the NFC device 102 is turned off or otherwise in a non-powered state, for example because its battery is discharged, the NFC router 202 for example operates in the card emulation mode in which a signal may be received from a card reader 301. In this mode, the processor 302 and memory 304 are for example powered by the supply voltage $V_R$ extracted from the received wireless signal. However, in some embodiments, for example if there is still power remaining in the battery, the processor 302 and memory 304 may be powered by the battery (not shown in FIG. 3). The memory 304 is for example accessible in this mode by the external device, although one or more access conditions may be applied, as will be described in more detail below.

Furthermore, in some embodiments, the memory 304 is accessible by external devices only for read operations, and not for write operations.

Thus, by transferring, by the host processing device 206 to the NFC router 202, the data to be shared, card emulation can be used to access this data even if the NFC device 102 is switched off or if the battery is discharged.

In some embodiments, the NFC device may be capable of operating in an NFC disabled mode in which the transmission of NFC communications via the NFC antenna circuit is generally disabled. For example, a user of the NFC device may decide to disable the transmission of NFC communications to reduce power consumption or prevent RF transmissions from the device. The memory 304 or another non-volatile storage device of the NFC router for example stores one more configuration bits indicating whether or not the NFC device is operating in the NFC disabled mode. Alternatively, one or more bits indicating whether or not the NFC device is operating in the NFC disabled mode are stored in a volatile memory, such as a RAM (random access memory), of the NFC router or of the NFC device. For example, in some embodiments, the one or more bits are stored in the RAM while the NFC device is switched ON, and one or more configuration bits are set to store the NFC enabled/disabled state when the NFC device is switched OFF. The NFC router 202 for example comprises an override mechanism for over-riding the general restriction of NFC communications during the NFC disabled mode.

For example, the memory 304 or another non-volatile storage device of the NFC router stores one or more further configuration bits indicating that the NFC disabled mode can be over-ridden if, for example, the charge state of the battery of the NFC device is below a threshold, such as being entirely discharged or otherwise non-functional, or if, for example, the battery is removed or otherwise disconnected from the NFC device.

Thus, if the external NFC device makes a request to access to the shared data while the NFC device is in the NFC disabled mode, the NFC router is for example adapted to verify that the further configuration bits permit an over-ride of the NFC disabled mode. If so, the NFC router is for example adapted to verify a charge state of a battery of the NFC device, and to reactive NFC communications and permit access to the shared data only if the charge state of the battery is below a threshold level. In some embodiments the charge state of the battery is determined by detecting whether a supply current of the NFC router is being drawn from the battery of the NFC device or from the NFC field, and for example only in the latter case can the NFC disabled mode be over-ridden.

Figure 4:
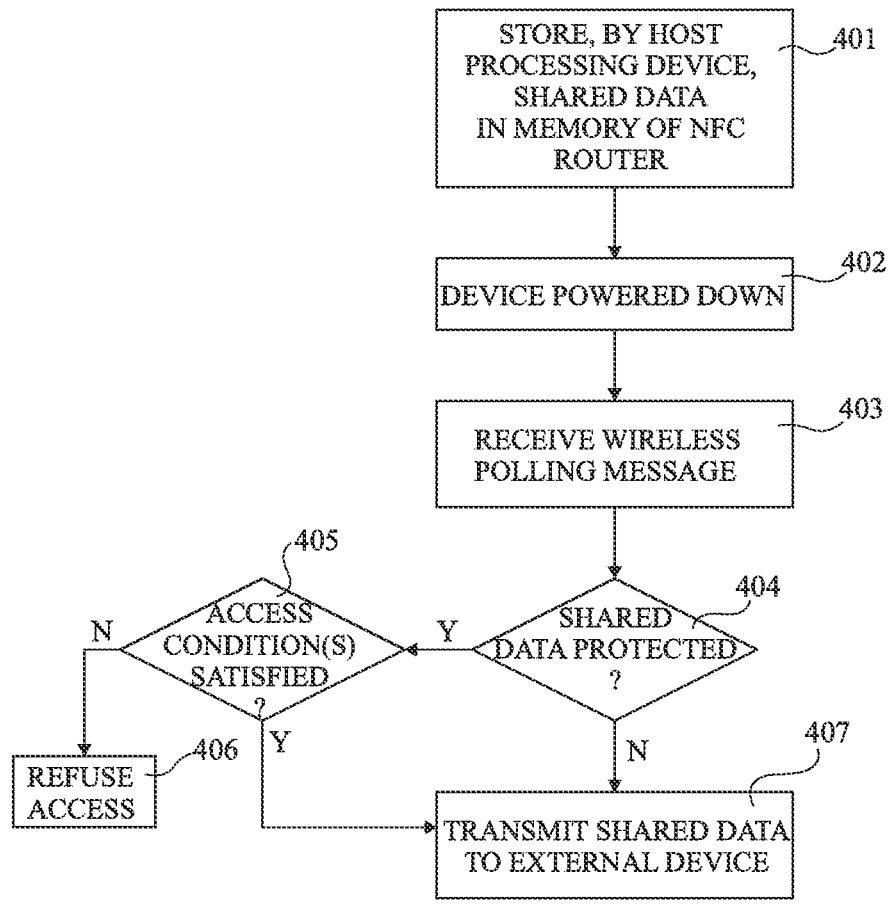
FIG. 4 is a flow diagram illustrating operations in a method of accessing shared data using an NFC interface according to an example embodiment of the present disclosure.

FIG. 4 is a flow diagram illustrating operations in a method of accessing the shared data according to an example embodiment.

Initially, it is assumed that the NFC device 102 is powered, such that the host processing device 206 is operational.

In an operation 401, the host processing device 206 stores shared data 306 to the memory 304 of the NFC router 202.

For example, in some embodiments, the shared data comprises a code providing access to an event, such as an airplane ticket, a train ticket, theatre ticket, hotel booking, or the like.

Alternatively, the shared data may comprises data to be kept safe, for example in the case that the NFC device 102 is on the verge of being damaged. For example, the data provided by one or more of the sensors 326 may indicate that the NFC device is at risk of damage, and the shared data for example comprises one or more readings from the sensors 326, and/or other data such as passwords, encryption keys, etc. Data stored by the NFC router 202 generally has more chance of being successfully recovered later than data stored elsewhere in the NFC device 102 because the NFC router 202 is generally a chip having relatively high levels of protection from impacts and/or exposure to liquids when compared to other elements of the NFC device 102.

In a subsequent operation 402, the NFC device 102 is powered down. For example, the NFC device 102 is turned off by a user, or turns off automatically due to a discharged battery. Alternatively, the NFC device 102 may lose power due to a mechanical stress applied to it, causing for example damage to the battery and/or its wiring, or because of a short circuit caused by immersion of the NFC device 102 in a liquid.

In a subsequent operation 403, a wireless polling message is received from an external device, such as the RF reader 301 of FIG. 3. The polling message for example includes a request for access to the memory 304 of the NFC router 202. It will be apparent to those skilled in the art that there are a range of protocols that could be used for the communications for accessing the memory 304. For example, in some embodiments the protocol defined by the international standard ISO7816, based on read binary and update binary commands, could be employed.

In a subsequent operation 404, the processing device 302 for example determines whether or not the shared data stored in the memory 304 is protected by access conditions.

The shared data 306 may be sensitive data with restricted access. For example, in some embodiments the sensitive data comprises one or more readings made by the sensors 326, and/or other data such as passwords, encryption keys, etc. In some embodiments, the shared data may be freely accessible by the processor 206 of the NFC device, but access is restricted when any external device attempts to access the data. In other embodiments, the access conditions to be applied may be additionally or alternatively dependent on the ON/OFF state of the mobile device and/or on the charge state of the battery of the mobile device.

If it is determined in operation 404 that the shared data is protected, the next operation is 405, in which one or more access conditions are verified.

For example, the protection mechanism may include a symmetric or asymmetric signature or the like. In the case that a symmetric signature is employed, verifying the access condition for example involves verifying a digital signature associated with the access request. For example, the digital signature is a DES-MAC (Data Encryption Standard Message Authentication Code) associated with the access request. The verification for example involves calculating, by the NFC router 202, the signature based on the data provided in the access request or in another message received from the external device. The signature generated by the NFC router 202 is then compared with a signature provided by the external device, and if the signatures match, the access condition is considered to be met. For example, the signature forms the last 8 bytes of the access request. In one embodiment, the signature is a MAC according to the standard ISO/IEC 9797-1 Algorithm 3. The generation of such a MAC is for example discussed in more detail in the chapter A1.2.1 of Book 2, Security and Key Management, of the EMV specification version 4.3, the contents of which is hereby incorporated by reference to the extent permitted by the law. The fact that the access request contains a signature is for example mentioned in the CLA byte of the command according to the EMV specification.

In alternative embodiments, the NFC router 202 may respond to the polling request from the RF reader 301 by verifying an encryption/decryption key held by the RF reader 301 with respect to one that it holds. This may involve transmitting, by the NFC router 202, a data value to the RF reader 301 for encryption or decryption using the key held by the reader 301. The NFC router 202 may also encrypt or decrypt the data value based on the key it holds, and may verify that the response from the RF reader 301 matches its own calculated value.

Of course, there are many other protection mechanisms based on signatures, keys, passwords or passcodes that could be employed. Furthermore, in some embodiments, an access condition may be based on the charge state of the battery, as described above.

If one or more of the access conditions is not satisfied, the next operation is for example 406, in which access to the shared data is refused. For example, a message is transmitted to the RF reader 301 with a failure message.

Alternatively, if all access conditions of operation 405 have been satisfied, the next operation is for example 407, in which the shared data is transmitted to the external device.

Operation 407 is also for example performed if in operation 404 it is determined that the shared data is not protected. For example, the shared data may comprise data that is to be wirelessly accessible by an external device at any time, whether or not the NFC device 102 is powered. For example, data representing an event ticket such as a boarding pass, train ticket, etc., may be freely accessible by any RF reader, but may be encoded such that only certain authorized readers are able to decode and interpret the data.

Figure 5:
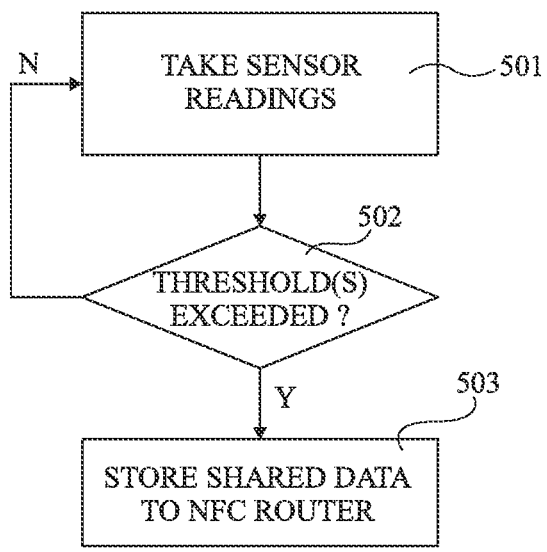
FIG. 5 is a flow diagram illustrating operations in a method of generating shared data.

FIG. 5 is a flow diagram illustrating a method of generating and storing the shared data 306 to the memory 304 of the NFC router 202 of FIG. 3 according to an example embodiment.

In a first operation 501, one or more readings are taken using the one or more sensors 326 of the NFC device of FIG. 3.

In a subsequent operation 502, it is determined whether any of the readings from the sensors 326 exceed a given threshold. The thresholds are for example chosen as corresponding to levels of the environmental parameters captured by the sensors that are unlikely to occur during normal operating conditions of the NFC device 102, and that indicate that damage to the NFC device 102 is likely to occur.

If in operation 502 none of the thresholds are exceeded, the method for example returns to operation 501, in which, after a certain time delay such as a few seconds or a few minutes, one or more new sensor readings are taken.

Alternatively, if in operation 502 one or more thresholds is exceeded, the next operation is 503, in which the shared data is stored to the memory 304 of the NFC router 202. For example, the shared data may include one or more readings leading up to the threshold being exceeded in operation 502. Additionally or alternatively, the shared data may consist of data that is to be conserved, such as encryption keys, passwords or the like.

An advantage of the embodiments described herein is that data in an NFC device may be accessible even when the NFC device is no longer powered. Furthermore, the data may be accessible by both a processing device of the NFC device and by an external device, and different access conditions can be applied depending on the device that wishes to access the data.

Having thus described at least one illustrative embodiment, various alterations, modifications and improvements will readily occur to those skilled in the art.

For example, while a particular example of an NFC antenna circuit has been described in FIG. 3, it will be apparent to those skilled in the art that various alternative circuits would be possible.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A near field communications (NFC) device, comprising:
   an NFC router having a secure memory adapted to store shared data, the shared data accessible to a plurality of devices, wherein at least one of the plurality of devices is an external device;
   an NFC antenna circuit, wherein the NFC router is capable of operating in a card emulation mode in which the shared data stored by the secure memory is accessible via the NFC antenna circuit;
   an instruction memory different from the secure memory of the NFC router; and
   a host processor coupled to the instruction memory and arranged to control the NFC device using instructions retrieved from the instruction memory, the host processor further coupled to the NFC router and capable of accessing the shared data in the secure memory, wherein the NFC router is adapted to:
   receive requests to access the shared data in the secure memory from the host processor according to at least some of the instructions retrieved from the instruction memory;
   receive requests to access the shared data in the secure memory from the external device via commands passed through the NFC antenna circuit;
   detect for each received request to access the shared data whether the host processor or the external device sent the respective request to access the shared data;
   selectively verify one or more first access conditions prior to permitting access to the shared data when the external device requested access to the shared data; and
   selectively verify one or more second access conditions prior to permitting access to the shared data when the host processor requested access to the shared data,
   wherein selectively verifying at least one of the first or second access conditions includes verifying a digital signature associated with the requested access to the shared data.

2. The NFC device of claim 1, wherein the NFC router is adapted to verify, in response to a request from an external device to access the shared data, the one or more first access conditions before transmitting the shared data to the external device via the NFC antenna circuit.

3. The NFC device of claim 1, wherein the processor is adapted to provide the shared data to be stored in said secure memory.

4. The NFC device of claim 1, wherein the NFC router is adapted to apply the one or more first access conditions upon detecting that the external device has requested access to the shared data.

5. The NFC device of claim 1, wherein the NFC device is capable of operating in an NFC-disabled mode in which transmission of NFC communications via the NFC antenna circuit are disabled, wherein if the external device requests access to the shared data while the NFC router is in the NFC-disabled mode, the NFC router is adapted to verify a first of the one or more first access conditions by verifying a charge state of a battery of the NFC device.

6. The NFC device of claim 5, wherein the NFC router is further adapted to re-enable transmission of NFC communications and permit access to the shared data by the external device only if the charge state of the battery is below a threshold level.

7. The NFC device of claim 1, wherein the NFC router is adapted to:
apply the one more first access conditions upon detecting that the external device has requested access to the shared data; and
apply one or more second access conditions, at least one of which is different from the one or more first access conditions, upon detecting that the host processor has requested access to the shared data.

8. The NFC device of claim 1, wherein the one or more first access conditions to be applied are selected based further on one or more of:
an ON/OFF state of the NFC device;
a charge state of a battery of the NFC device; and
whether the requested access to the shared data is a read or write request.

9. The NFC device of claim 1, wherein the shared data stored by the secure memory includes first data and second data, and wherein the NFC router is adapted to permit access to the first data by the external device without any access condition and to prevent access to the second data by the external device until the one or more first access conditions are satisfied.

10. The NFC device of claim 1, further comprising:
one or more sensors to detect one or more environmental parameters, wherein the NFC router is adapted to store the shared data in said secure memory if a reading from at least one of the one or more sensors exceeds a threshold.

11. The NFC device of claim 10, wherein said one or more sensors comprise at least one of:
a humidity sensor;
an accelerometer;
a positioning device; and
a temperature sensor.

12. A method, comprising:
providing a secure memory of a near field communications (NFC) router of an NFC device;
providing an instruction memory of the NFC device, the instruction memory different from the secure memory of the NFC router;
coupling a host processor of the NFC device to the instruction memory, the host processor further coupled to the NFC router;
storing shared data in the secure memory, the shared data accessible to the host processor and to an external device;
controlling the NFC device with the host processor by executing instructions retrieved from the instruction memory;
during a card emulation mode, providing by the NFC router to the external device access to the shared data via an NFC antenna circuit;
receiving a request from the host processor to access the shared data in the secure memory;
detecting, by the NFC router, whether a device requesting to access the shared data is the host processor of the NFC device or the external device;
selectively verifying one or more first access conditions prior to permitting access to the shared data when the external device requested access to the shared data; and
selectively verifying one or more second access conditions prior to permitting access to the shared data when the host processor requested access to the shared data,
wherein selectively verifying at least one of the first or second access conditions includes verifying a digital signature associated with the requested access to the shared data.

13. The method of claim 12, further comprising:
transmitting the shared data to the external device if the one or more first access conditions are satisfied.

14. The method of claim 12, comprising:
verifying, by the NFC router, the one or more first access conditions upon detecting that the device requesting access to the shared data is the external device.

15. The method of claim 12, comprising:
operating the NEC device in an NFC-disabled mode in which transmission of NEC communications via the NEC antenna circuit are disabled; and
when the external device requests access to the shared data while the NFC router is in the NFC-disabled mode, applying a first of the one or more first access conditions, wherein the applying includes verifying, by the NFC router, a charge state of a battery of the NFC device.

16. The method of claim 15, further comprising:
re-enabling transmission of NFC communications; and
permitting access to the shared data by the external device only if the charge state of the battery is below a threshold level.

17. The method of claim 12, further comprising:
detecting, via one or more sensors, one or more environmental parameters, wherein storing data in the secure memory is triggered by a reading from at least one of the one or more sensors exceeding a threshold.

18. The method of claim 17, wherein said one or more environmental parameters comprise at least one of:
a humidity level;
an acceleration reading;
a geographic position of the NFC device; and
a temperature level.

19. A mobile device, comprising:
a host processor arranged to direct operations of the mobile device;
a near field communications (NFC) router, the NFC router coupled to the host processor and configured to operate in a card emulation mode;
a secure memory integrated with the NFC router;
an instruction memory, the instruction memory different from the secure memory of the NFC router, wherein the instruction memory is arranged to store instructions executable by the host process to direct the operations of the mobile device;
an NFC antenna circuit coupled to the NFC router; and an NFC processing device arranged to selective provide access to shared data stored in the secure memory integrated with the NFC router, wherein the shared data stored in the secure memory is accessible to the external device via the NFC antenna circuit when the NFC router is operating in the card emulation mode only after verifying one or more first access conditions, wherein the shared data stored in the secure memory is accessible by the host processor only after verifying one or more second access conditions, wherein selectively verifying at least one of the first or second access conditions includes verifying a digital signature associated with the requested access to the shared data.

20. The mobile device of claim 19, further comprising:
a sensor input coupled to the host processor and coupled to at least one of a humidity sensor, an accelerometer, a positioning device, and a temperature sensor, wherein the host processor is configured to direct the NFC router to store the shared data in the secure memory when a reading passed via the sensor input exceeds a threshold.

21. The mobile device of claim 19, wherein the one or more first access conditions includes verification of an ON/OFF state of the mobile device, verification of a charge state of a battery coupled to the mobile device, verification of a request to read from the secure memory, and verification of a request to write to the secure memory.

22. The mobile device of claim 19, wherein the access to the shared data from the external device only includes read access.

23. The mobile device of claim 19, further comprising:
a secure element, the secure element arranged to store a digital signature, wherein access to the shared data is granted to the external device via the NFC antenna circuit after the NFC router verifies that data in an access request from the external device corresponds to the digital signature.

* * * * *

UNITED STATES PATENT AND TRADEMARK OFFICE
CERTIFICATE OF CORRECTION

PATENT NO. : 9,628,146 B2  
APPLICATION NO. : 14/871851  
DATED : April 18, 2017  
INVENTOR(S) : Olivier Van Nieuwenhuyze et al.

It is certified that error appears in the above-identified patent and that said Letters Patent is hereby corrected as shown below:

On the Title Page

Item (73), Assignees:
"Proton World International N.V., Diegem (BE); STMICROELECTRONIC (Rousset) SAS, Rousset (FR)" should read, --Proton World International N.V., Diegem (BE); STMICROELECTRONICS (Rousset) SAS, Rousset (FR)--.

In the Claims

Column 12, Lines 10-12:
"The mobile device of claim 19, wherein the access to the shared data from the external device only includes read access." should read, --The mobile device of claim 19, wherein access to the shared data from the external device only includes read access.--.

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*